United States Patent [19]

Draghetti

[11] Patent Number: 5,133,446
[45] Date of Patent: Jul. 28, 1992

[54] DEVICE FOR THE FORMATION AND TRANSFER OF GROUPS OF COMMODITIES

[75] Inventor: Fiorenzo Draghetti, Medicina, Italy

[73] Assignee: G. D. Societa per Azioni, Bologna, Italy

[21] Appl. No.: 725,455

[22] Filed: Jul. 3, 1991

[30] Foreign Application Priority Data

Jul. 4, 1990 [IT] Italy .................... 3578 A/90

[51] Int. Cl.⁵ ............................. B65G 47/30
[52] U.S. Cl. ................. 198/418.5; 198/429; 198/432; 198/606
[58] Field of Search .......... 198/418.5, 429, 432, 198/457, 469.1, 606

[56] References Cited

U.S. PATENT DOCUMENTS

| | | | |
|---|---|---|---|
| 3,636,958 | 1/1972 | Sundberg et al. | 198/429 X |
| 3,837,466 | 9/1974 | Jones | 198/429 X |
| 4,610,347 | 9/1986 | Inoko | 198/432 X |
| 4,732,256 | 3/1988 | Dorner | 198/347.3 |
| 4,768,642 | 9/1988 | Hunter | |
| 4,932,190 | 6/1990 | Bergner et al. | 198/418.5 X |

FOREIGN PATENT DOCUMENTS

| | | |
|---|---|---|
| 0027876 | 5/1981 | European Pat. Off. . |
| 1490658 | 6/1966 | France .................. 198/429 |
| 0127224 | 5/1990 | Japan .................. 198/418.5 |
| 1075827 | 6/1967 | United Kingdom . |
| 1136353 | 12/1968 | United Kingdom . |
| 1464245 | 2/1977 | United Kingdom . |

Primary Examiner—D. GLenn Dayoan
Attorney, Agent, or Firm—Cushman, Darby & Cushman

[57] ABSTRACT

A device by which commodities emerging in single file from a supply unit are formed into groups and transferred to a wrapping machine includes feed belts, by which the single commodities are directed from the supply unit to a transfer station, a traversing system by which rows of the commodities are diverted repeatedly from the single file at right angles to the initial feed direction, a conveyor belt moving in a direction parallel to that of the single file and by which the formed groups are transferred toward the wrapping machine, and a plurality of bays provided by the conveyor belt. Each bay is designed to accommodate a plurality of the rows diverted to accommodate a plurality of the rows diverted in succession from the single file of commodities and making up one group.

5 Claims, 2 Drawing Sheets

DEVICE FOR THE FORMATION AND TRANSFER OF GROUPS OF COMMODITIES

BACKGROUND OF THE INVENTION

The present invention relates to a device for the formation and transfer of groups of commodities. In particular, the invention relates to a device by means of which single commodities of substantially parallelepiped shape are assembled into groups and fed as groups in a given direction. Conventionally, the need often arises in general manufacturing for discrete commodities proceeding in single file to be ordered into groups each composed of a prescribed number of ranks and files. The substantially parallelepiped groups formed in this manner are supplied to a production machine, for example a wrapping unit. The prior art teaches the formation of such groups by means of a push rod, reciprocated transversely to the single file of commodities, which with each operating stroke impinges on a given number of the discrete commodities and directs them into one of a plurality of equispaced pockets or compartments provided by a transfer wheel. Once the single pocket is filled with a group of commodities of the prescribed number, following the corresponding number of strokes of the push rod, the transfer wheel will index one or more steps and ultimately release the group onto a feed conveyor supplying the aforementioned wrapping unit. Systems utilizing transfer means of the type thus outlined have certain drawbacks. Any operation connected with a change in the size of commodity handled proves extremely expensive, given that this dictates a wholesale replacement of the transfer wheel, and many other auxiliary components besides. Moreover, where the group is to be composed of a large number of commodities, the transfer wheel assumes proportions of considerable bulk.

SUMMARY OF THE INVENTION

The object of the present invention is to provide a device of the type described above which has none of the drawbacks attributable to the prior art as aforementioned, and more especially, a device by which changes in the size of the discrete commodity can be accommodated with notable simplicity and to considerable economic advantage, with no variation in the overall dimensions of the device itself.

The stated object is realized, according to the present invention, in a device by which commodities dispensed from a supply unit are formed into groups and transferred to a production machine. Such a device comprises feed means by which the commodities are directed in single file from the supply unit toward a transfer station, a traversing system by which successive like-sized incremental portions of the single file of commodities are diverted in a direction normal to the feed direction, belt conveyor means moving in a direction parallel to that of the single file, by which the formed groups are transferred toward the production machine, and a plurality of bays associated with the belt conveyor means, each one of these bays accommodating a plurality of the portions diverted from the single file of commodities, received in succession and constituting one group.

BRIEF DESCRIPTION OF THE DRAWINGS

The invention will now be described in detail, by way of example, with the aid of the accompanying drawings, in which.

DESCRIPTION OF THE PREFERRED EMBODIMENTS

Figure 1:
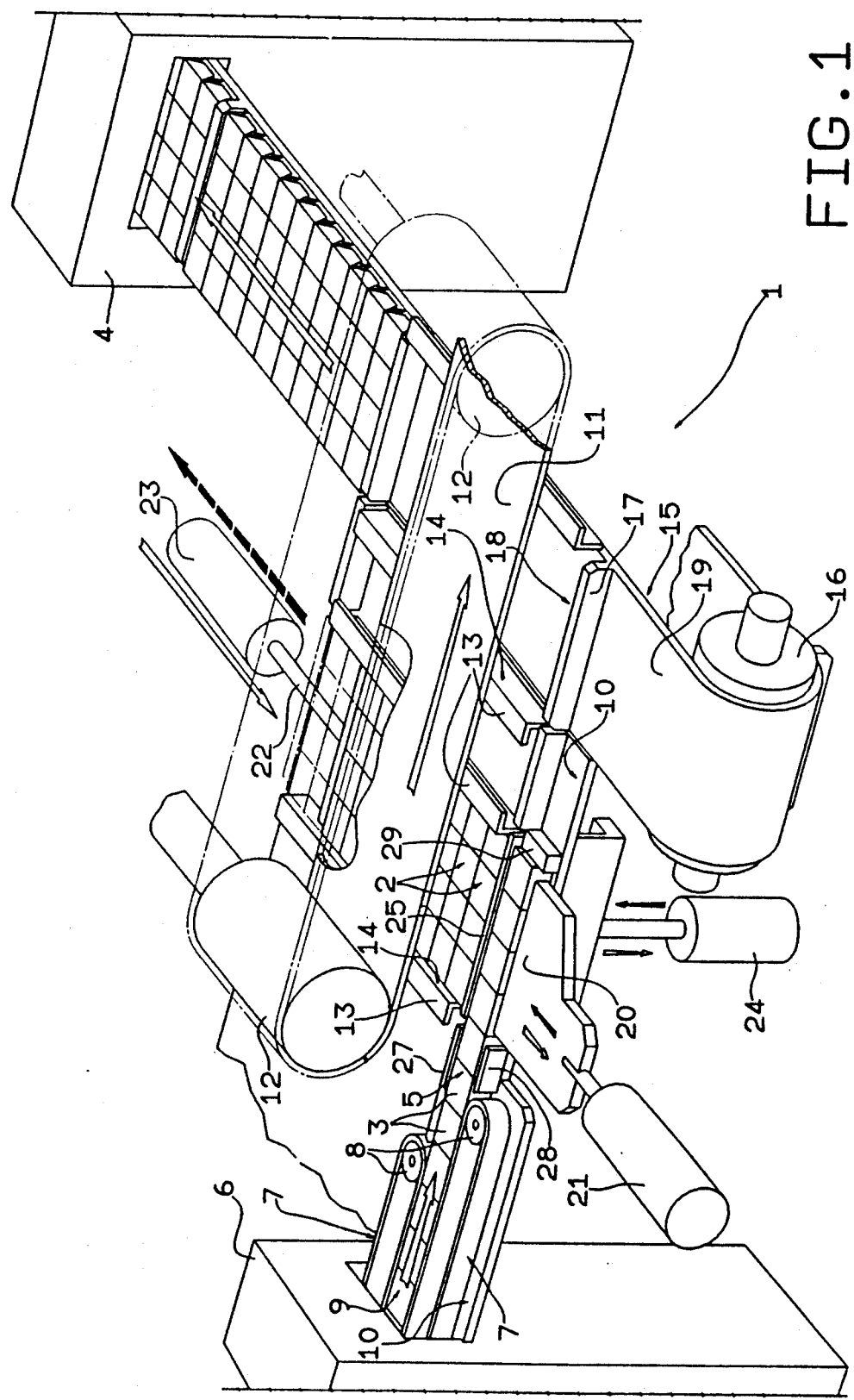
FIG. 1 is the schematic representation of a device embodied according to the present invention, viewed in axonometric projection.
Figure 2:
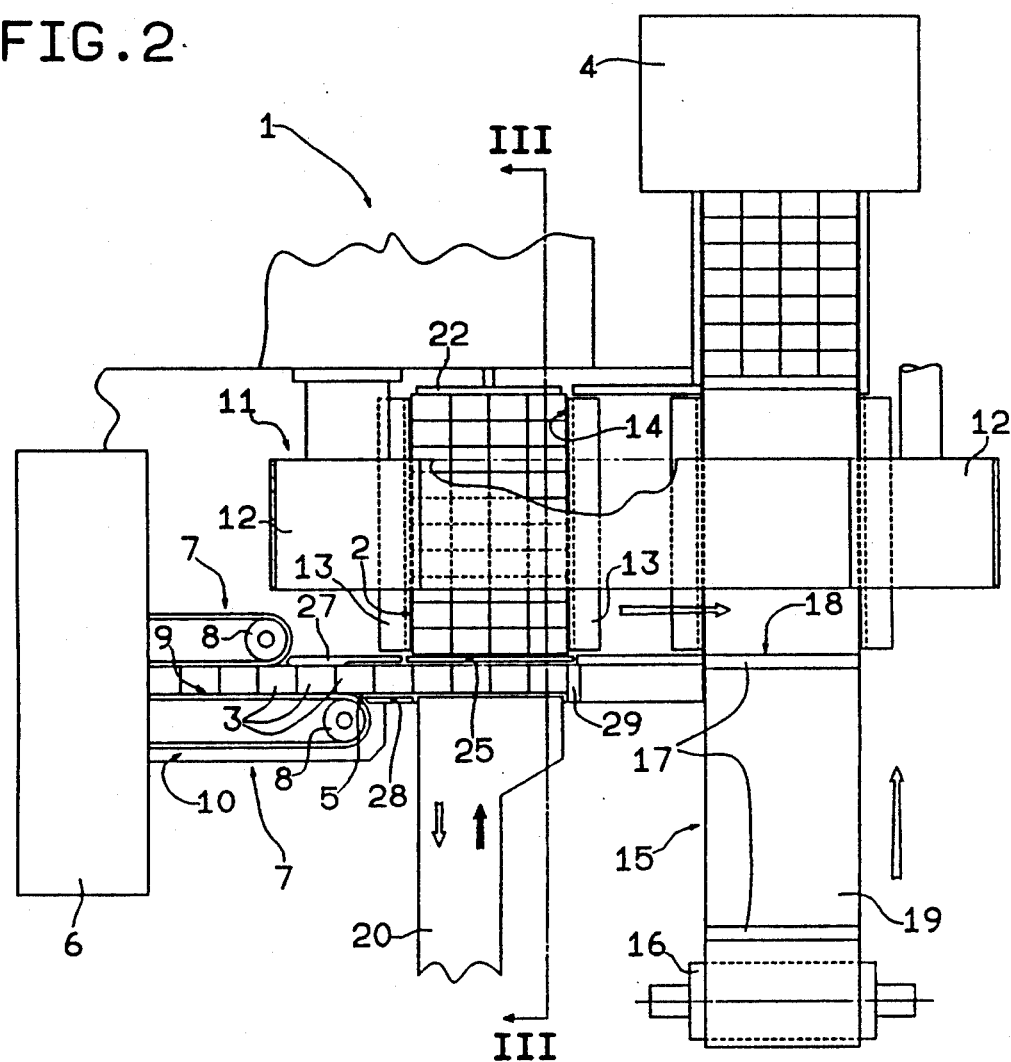
FIG. 2 is a schematic representation of the device of FIG. 1, viewed in top plan.
Figure 3:
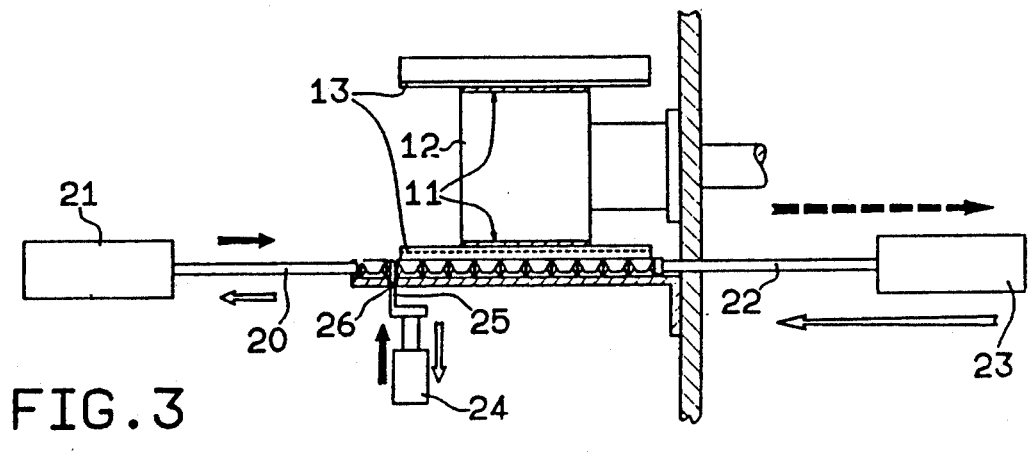
FIG. 3 is a schematic representation of one part of the device of FIG. 1, viewed partly in vertical section and partly in elevation.

With reference in particular to FIGS. 1 and 2 of the drawings, the numeral 1 denotes a device, in its entirety, by which single commodities 3 are formed into groups 2 and transferred, as groups, to a production machine, for example a wrapping unit, schematically denoted by the numeral 4. The commodities 3 are directed toward the device 1 in a single file 5 from a supply unit schematically denoted by the numeral 6. The single file 5 of discrete commodities 3 emerges from the supply unit 6 guided and conveyed by feed means comprising a pair of mutually parallel belts 7 looped around corresponding pairs of rollers 8 of which the axes are vertically disposed (one roller only of each pair is shown in the drawings). The feed belts 7 combine to create a channel 9 and are positioned directly above a horizontal table 10 slidably supporting the advancing commodities 3. The numeral 11 denotes a first conveyor belt, looped around two rollers 12 disposed with axes lying horizontal and normal to the feed direction of the single file 5 of commodities 3. The outward facing surface of the belt 11 supports a plurality of rigidly associated slats 13 disposed parallel with the axes of the rollers 12. The slats 13 are regularly spaced apart and arranged in pairs to form relative bays 14. The looped belt 11 is disposed with a section of its lower branch positioned above a section of the horizontal table 10, separated from the surface by a distance substantially equal to the depth of the commodity 3, as measured in the vertical direction. The numeral 15 denotes a second conveyor belt, by which the formed groups 2 of commodities 3 are fed toward the wrapping unit 4. The belt 15 is looped around two rollers 16 (one only of which visible in FIG. 1) located on opposite sides of the first belt 11 and disposed with axes horizontal and parallel to the feed direction of the single file 5 of commodities. The external surface of this second belt 15 is also fitted with slats 17, disposed parallel to the axes of the rollers 16, spaced apart at regular distance and combining to create bays denoted 18. The uppermost, conveying branch (i.e., carrying run) 19 of the belt 15 occupies substantially the same plane as that of the horizontal table 10. Moreover, one edge of the table (that on the right as viewed in FIGS. 1 and 2) is positioned nearly, but not actually in contact with a portion of the left hand edge of this same branch 19 of the belt 15. The width of the table 10 at the edge in question, is at least equal to the distance that separates two adjacent slats 17. With reference also to FIGS. 2 and 3, the device 1 further comprises a pushing element 20, which is associated with a conventional actuator 21 and able thus to reciprocate horizontally in a direction parallel to the feed direction of the second belt loop 15. The pushing element 20 occupies a position definable as a first transfer station, and is disposed with its pushing face adjacent to the part of the single file 5 of commodities 5 lying beyond the channel 9 created by the two feed belts 7. More exactly, the pushing element 20 is disposed at a height such as to impinge on the side faces of a prescribed number of commodities 3 constituting a part of the single file 5 and occupying the horizontal table 10. The numeral 22 denotes a reaction element that is located in opposition to the pushing element 20 and rendered capable of intermittent motion along an axis complementary to that of the pushing element, through the agency of a conventional actuator schematically denoted 23, between an extended position near to the ends of the slats 13 currently alongside the single file 5 of commodities, and a retracted position near to the opposite ends of the selfsame slats 13. When retracting, that is to say, moving away from the pushing element 20, the reaction element 22 recedes intermittently through steps substantially equal in length to the transverse dimension of the file 5 of commodities 3, whereas when extending toward the pushing element 20, its movement is continuous. The pushing element 20 and the reaction element 22 together constitute traversing means, and are referred to as such in the specification.

The numeral 24 denotes a further actuator occupying a fixed position below the horizontal table 10, the purpose of which is to reciprocate barrier means denoted 25 in a vertical direction. The barrier means include a vane occupying a vertical plane that is normal to the axis of movement of the pushing element 20 and located between the first conveyor belt 11 and the portion of the single file 5 of commodities 3 lying beyond the channel 9, considered in the feed direction. To this end, the horizontal table 10 provides a slot 26 through which the vane 25 is able to stroke between a lowered position, distanced from the plane occupied by the commodities 3, and a raised position of intersection with the trajectory of the pushing element 20. In operation, with a vacant bay 14 of the first conveyor belt 11 lying stationary and in alignment with the trajectory of the pushing element 20, a continuous single file 5 of commodities 3 emerging from the supply unit 6 is indexed forward by the intermittently rotating feed belts 7, advancing between two lateral connecting guides 27 and 28 to the point at which the leading commodity 3 engages a stop 29 mounted to the table 10. At this juncture, the single file of commodities 3 will have filled the continuation of the channel 9 encompassed by the working surface of the pushing element 20 on the one hand and the uppermost part of the vane 25 on the other, whereupon the vane 25 is lowered by the corresponding actuator 24. The pushing element 20 is then driven forward by its actuator 21 toward the awaiting bay 14, engaging four commodities 3 as a single row and traversing them to a point immediately beyond the slot 26, within the bay 14. The diversion of the four commodities 3 effected in this manner by the pushing element 20 occurs with the assistance of the reaction element 22, which is caused to recede by its actuator 23 from an initial position, immediately alongside the vane 25, to a position separated from the slot 26 by a distance that is substantially equal to the transverse dimension of the row of commodities 3. The actuators 21 and 24 now operate to return the pushing element 20 and the vane 25 to the retracted and raised position, respectively, such that the four commodities 3 are held correctly in position internally of the bay 14. The sequence of steps thus described is repeated substantially in the same manner each time four more commodities 3 of the single file 5 are brought alongside the pushing element 20. Clearly, with the admission of each row of four commodities to the bay 14, the reaction element 22 recedes one step farther from the slot 26, hence from the entry to the bay. With the bay 14 filled to capacity, the reaction element 22 will be positioned externally of the slats 13 and the conveyor 11 is able to index, carrying the assembled group 2 of commodities 3 toward the junction of the table 10 and the second belt 15, definable as a second transfer station, and into an empty bay 18 of the stationary belt 15. As the reaction element 22 returns to its initial extended position up against the vane 25, passing between the slats 13 of the next vacant bay 14, the group 2 formed previously is directed by the second conveyor belt 15 toward the wrapping unit 4. The steps described above are repeated to form a successive group 2. Advantageously, cleaning and maintenance of the device 1 are facilitated by virtue of the fact that the first conveyor belt 11 can be distanced from the operating position illustrated in the drawings, for example by rotation about the axis of one of the rollers 12. It will be clear that the stated objects are fully realized by the device 1 described in the foregoing specification. Should it become necessary, in effect, to handle groups 2 of commodities 3 of which the dimensions are different from those notionally described and illustrated, or to adopt a different formation, the operations required to adapt the device 1 to the new conditions are simple, swift and inexpensive, given that in practice such operations are confined to replacing the belts and/or adjusting the various parts governing the dimensions of the bays in which the groups 2 are accommodated. Needless to say, the replacement of conveyor belts is immeasurably more expedient than the replacement of a transfer wheel as taught by the prior art.

What is claimed:

1. A device for forming a single-file supply of like articles being received from an upstream supply into like multiple-file groups, and transferring these groups, in succession, towards a downstream location, said device comprising:

a feed means receiving a supply of like articles from an upstream supply and advancing said articles, in a first direction longitudinally successively in single file, into a first transfer station, within which the articles, in single file, serially engage one another and are supported on a substantially horizontal surface which extends from a pre-transfer article location to a post-transfer article location of said first transfer station;

a first endless conveyor belt means superimposed upon said post-transfer location of said first transfer station with vertical spacing from said substantially horizontal surface; said first endless conveyor belt having a downwardly facing, generally horizontal, lower carrying run arranged to advance in said first direction from upstream of said first transfer station, to downstream of a second transfer station, which is located downstream of said first transfer station in said first direction;

a second endless conveyor belt means superimposed upon said second transfer station and having an upwardly facing, generally horizontal, upper carrying run disposed generally horizontally and substantially as a same-level continuation of said substantially horizontal surface of said first transfer station; said upper carrying run of said second endless conveyor belt means being arranged to advance in a second direction which is normal to said first direction, from laterally to one side of said first endless conveyor belt, to a downstream location which is disposed laterally to an opposite side of said first endless conveyor belt;

a plurality of pairs of upstream and downstream slat means mounted to said first endless conveyor belt, each such pair defining between said slat means thereof a respective first bay, which, when located on said lower carrying run opens downwardly and has an effective spacing, longitudinally of said first endless conveyor belt having a given length which is substantially equal to a given integer multiple of a corresponding first dimension of said like articles, so that said given integer multiple number of said like articles can fit between said slats of a respective pair, when said respective pair is located on said lower carrying run at said first transfer station; said slats of each pair, when located at said first transfer station, approaching so closely to said substantially horizontal surface that lower edges thereof are located below upper extents of said articles, when said articles are supported on said substantially horizontal surface, so that each said given integer multiple of articles, when disposed within a respective said first bay, is effectively confined thereby longitudinally of said first endless conveyor belt;

horizontally, transversally acting transfer means for successively jointly transferring a respective given integer multiple of said articles then at a downstream end of said single file at said first transfer station, from said pre-transfer article location to said post-transfer article location, a given plurality of times in succession, and thereby assembling a givensize group of articles on said substantially horizontal surface and longitudinally confined between respective slat means of a respective said first bay;

said slat means on said first endless conveyor belt being spaced from one another by respective amounts such that longitudinally advancing said lower carrying run of said first endless conveyor belt sufficiently to advance a respective group of articles from said post-transfer location of said first transfer station, onto said upper carrying run of said second endless conveyor belt at said second transfer station, under urging action provided by a respective leading one of said first bays, brings also respective trailing one of said first bays to said post-transfer location of said first transfer station; and a plurality of pairs of upstream and downstream slat means mounted to said second endless conveyor belt, each such pair defining between said slat means thereof a respective second bay, which, when located on said upper carrying run opens upwardly and said effective spacing, longitudinally of said second endless conveyor belt having a given length which is substantially equal to a given integer multiple of a corresponding second dimension of said like articles, and which is normal to said corresponding first dimension of said given integer multiple of said like articles, so that a given number of files of said like articles equal to said given plurality of times, grouped together, can fit between said slats of a respective pair of slats of a respective second bay for advancement to said downstream location by longitudinal advancement of said upper-carrying run of said second endless conveyor belt means.

2. The device of claim 1, wherein:
said slat means of said first bays are rigidly connected to said first endless conveyor belt.

3. The device of claim 1, wherein:
said horizontally, transversally acting transfer means comprises a pusher for pushing articles at said first transfer station from said pre-transfer location towards said post-transfer location, and a reaction element acting against a laterally opposite side of said articles from said pusher, for falling back incrementally as articles are transferred laterally, to maintain said articles grouped together as said articles are being transferred laterally.

4. The device of claim 1, further including:
a vertically movable barrier vane at said first transfer station having a use position in which said vane provides a lateral boundary between said single file and a respective said first bay, and a retracted position, in which said vane is withdrawn so as to permit lateral transfer of a respective integer multiple of said articles by said transfer means, from said pre-transfer location, to said post-transfer location.

5. The device of claim 1, wherein:
the respective said slat means of each said first bay are spaced apart longitudinally of said first endless conveyor belt by an amount that is equal to the amount by which the respective said slat means of each said second bay are spaced apart longitudinally of said second endless conveyor belt.

* * * * *